United States Patent

[11] 3,597,039

| [72] | Inventor | Dieter Gruber |
| | | 31/35 Rue Saint-Ambroise, Paris, France |
| [21] | Appl. No. | 793,305 |
| [22] | Filed | Jan. 23, 1969 |
| [45] | Patented | Aug. 3, 1971 |
| [32] | Priority | Jan. 31, 1968 |
| [33] | | France |
| [31] | | 138,121 |

[54] CONTAINERS FOR TRANSPORTING GOODS
3 Claims, 9 Drawing Figs.

| [52] | U.S. Cl. | 312/352 |
| [51] | Int. Cl. | A47b 97/00 |
| [50] | Field of Search | 105/369 U, 369 A, 366, 368 T; 248/316, 119, 361; 306/4 C; 24/248 SA, 248 PP; 312/352 |

[56] References Cited
UNITED STATES PATENTS

| 1,209,705 | 12/1916 | Hayward | 269/238 |
| 1,852,586 | 4/1932 | McKnight | 269/237 |
| 3,182,608 | 5/1965 | Mollon | 244/118 X |
| 3,377,040 | 4/1968 | Hansen | 105/369 A |
| 3,399,921 | 9/1968 | Trost et al. | 248/119 |
| 3,429,536 | 2/1969 | Petry et al. | 248/361 X |

*Primary Examiner*—James T. McCall
*Attorneys*—Harry C. Bierman, Jordan B. Bierman and Bierman & Bierman ABSTRACT: The present invention relates to containers intended for holding goods during their transport.

The container according to the present invention comprises an internal device for holding against motion one or a plurality of pallets adapted to carry the goods to be transported when said pallet or pallets are laid on the floor of the container, said holding device comprising movable clamping members disposed above the lateral or transverse sides of the floor of said container so as to clamp the corresponding marginal portions of the pallet or pallets against the floor of the container.

The present invention relates also to a device for fastening and holding against motion one or a plurality of pallets inside a transport container of any type in order to convert same into a pallet-carrier container.

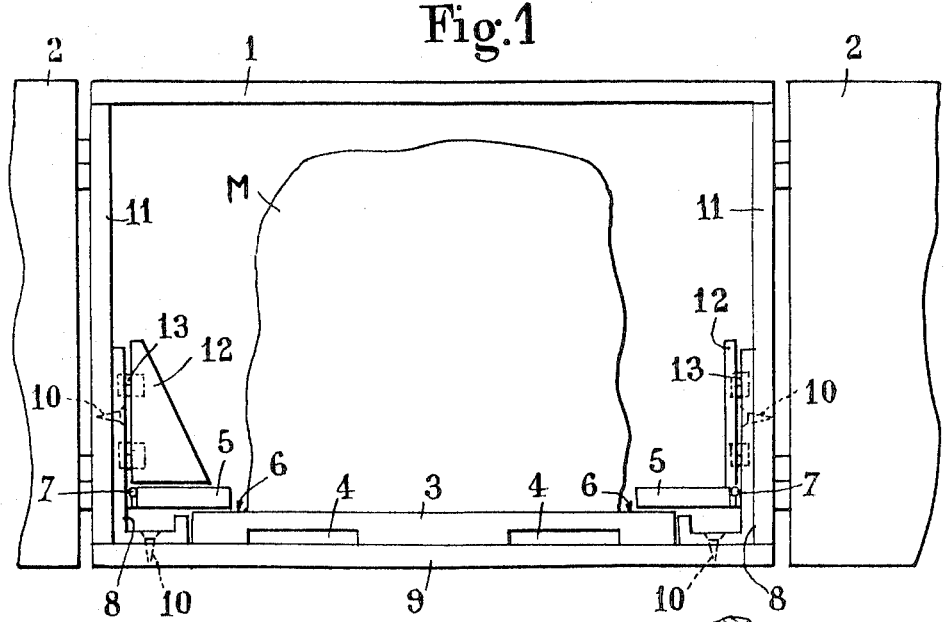
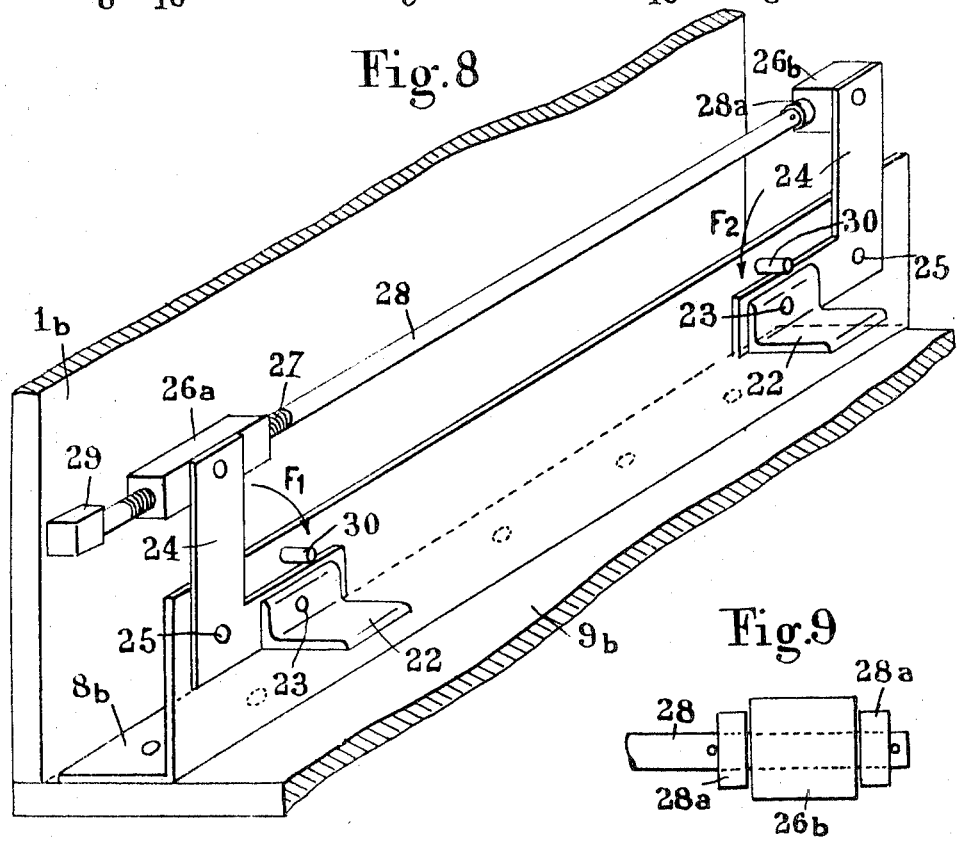

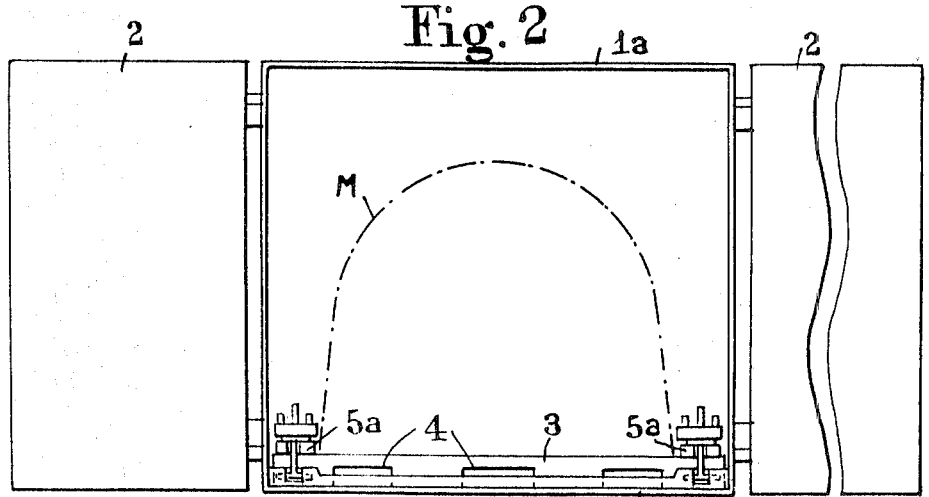
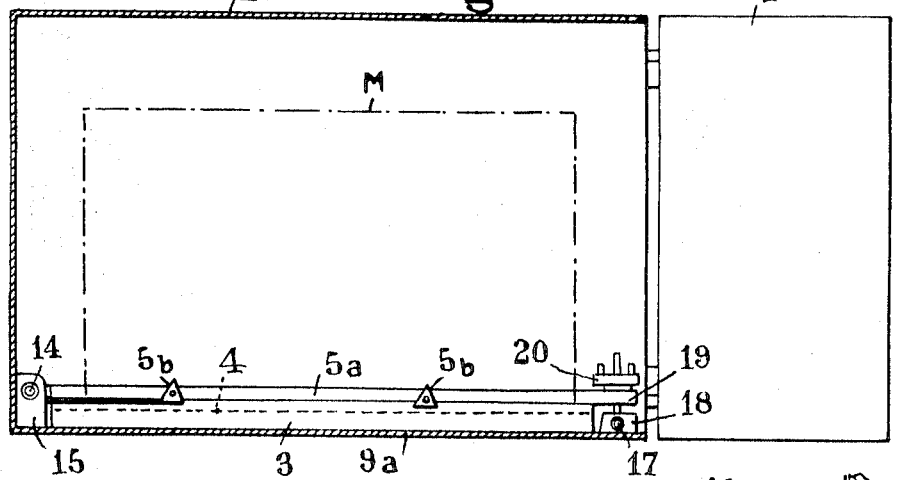
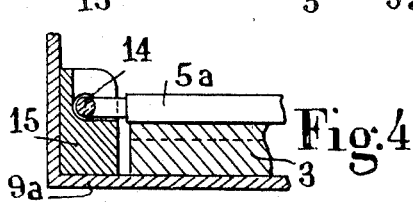
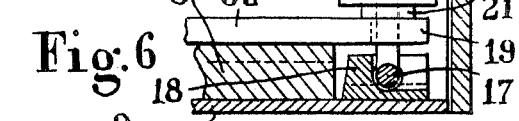
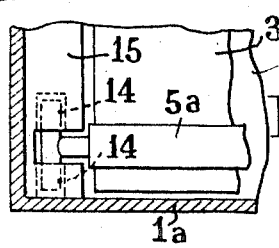
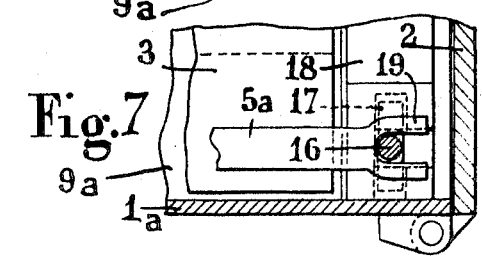

CONTAINERS FOR TRANSPORTING GOODS

The present invention relates to containers intended for holding goods during their transport.

Containers of this type are usually of rectangular parallelipipedic configuration. However, they comprise a door on one face to permit the introduction and proper positioning of the goods loads or products to be transported.

This loading operation, due to the considerable volume and/or weight of the goods thus transported, is attended by great difficulties which are well known to transport specialists.

In addition, it is also known that other difficulties are experienced when securing the goods within each container, as required by transport regulations. As a rule, these last-mentioned difficulties are due, in principle, on the one hand to the absence of adequate fastening means on the inner walls, floor and ceiling of these containers, and on the other hand to the fact that this operation must be performed from within the container, therefore in a relatively narrow space, when the goods are already placed therein.

In order to avoid these various inconveniences, it is the essential object of this invention to provide a container adapted to receive a pallet of a type already known per se which constitutes a conventional support for the goods to be transported.

This container is characterized essentially in that it comprises, internally, a device for holding against motion a pallet adapted to support the goods to be transported when this pallet is placed on the bottom or floor of the container, this holding device comprising movable clamping members overlying the lateral or transverse sides of the bottom or floor of the container so as to safely clamp the corresponding sides of the pallet against said bottom or floor.

Under these conditions, the use of a container according to this invention will facilitate on the one hand the introduction and positioning of the goods to be transported in the container, and on the other hand the subsequent fastening or securing of these goods therein.

Thus, the container according to this invention is characterized by considerably advantageous features when the transport of heavy, cumbersome, irregular-shaped, packed or unpacked goods is contemplated. Therefore, the use of this container can be contemplated for many hitherto unsuspected applications.

This invention is also concerned with a novel device for transporting goods, which comprises the combination of a container of the type broadly set forth hereinabove with one or a plurality of pallets of a type already known per se but adapted to be positioned in said container. In fact, instead of enclosing a single pallet occupying the entire floor area available in the container, the latter can also receive two or more pallets corresponding to fractions of this area, these fractions being adapted to support different goods which can thus be assembled in a common container.

Besides, this invention is further concerned with means for holding a pallet against motion in a container, these means being adaptable to conventional containers with a view to convert same into containers of the type set forth hereinabove, so that they can be loaded with goods disposed on one or a plurality of pallets.

However, other features and advantages of the subject matter of this invention will appear as the following description proceeds with reference to the attached drawings illustrating diagrammatically by way of example typical forms of embodiment of the invention. In the drawings:

FIG. 1 is a front elevational view with parts broken away, showing a first form of embodiment of a container constructed according to the teachings of this invention;

FIG. 2 is a similar view showing a second or modified form of embodiment of the container of this invention;

FIG. 3 is a sectional view of the same container;

FIGS. 4 and 6 are fragmentary sectional views showing different details of this container, the sections being taken along a longitudinal plane;

FIGS. 5 and 7 are fragmentary views showing the same details in section taken along horizontal planes; conveyor FIG. 8 is a fragmentary perspective view showing another form of embodiment of the fastening means provided in a container according to this invention, and FIG. 9 is a fragmentary plane view from above showing a detail of this specific form of embodiment.

In the form of embodiment illustrated in FIG. 1 the transport container according to this invention consists of a kind of crate 1 of substantially rectangular parallelipipedic configuration. This container comprises on the vertical inner face of one of its ends an aperture closed by a door consisting for example of a pair of hingedly mounted leaves 2. This container as well as its door may be made from any suitable material, such as wood, metal, plastic, etc.

According to the essential feature characterizing this invention this container comprises means adapted to hold against motion, inside the container, a pallet 3 on which the goods M to be transported have been secured beforehand.

This pallet 3 may consist as usual of a tray supported by longitudinal members or blocks providing therebetween passages 4 adapted to be engaged by the arms of a material-handling forklift truck.

This pallet is so dimensioned that it can be placed inside the container 1 and occupy substantially all of the floor space available therein. However, as already suggested hereinabove a plurality of pallets corresponding to fractions of this floor space may be used.

In the example illustrated the device contemplated for holding this pallet against motion comprises two bars 5 adapted to bear against the top of the lateral edges 6 of the pallet 3. Each bar 5 is hinged by connected along one of its edges, by means of a horizontal hinge 7, to the vertical wing of an angle section 8 disposed along the corresponding lateral side of the bottom or floor 9 of this container.

This angle section 8 constitutes a longitudinal member secured to the floor of the container through any suitable means such as screws or bolts 10. The vertical wing of this angle section 8 may be secured for example also by means of screws or bolts 10 to the adjacent lateral wall 11 of the container.

The cross-sectional contour of this section 8 may if desired be U-shaped with one vertical arm shorter than the other. The longer wing is directed in this case towards the center of the container so as to constitute a guide member to the pallet when the latter is introduced into the container.

Overlying each bar 5 is or are one or more vertical hinged plates 12 mounted by means of hinges 13 to the vertical wing of longitudinal member 8. Thus, these hinged plates can thus take two operative positions, namely:

an unfolded position in relation to the corresponding or adjacent lateral wall 11 of the container (see the hinged plate 12 shown in the left-hand portion of FIG. 1), in which each plate can bear on the top of the relevant bar 5 so as to clamp it against the upper surface 6 of the pallet 3;

a folded position in which it engages said corresponding or adjacent lateral wall 11 of the container (see the position of the right-hand hinged plate 12 of FIG. 1), in which said plates permit of raising the bars 5 when the pallet is being introduced into or removed from the container.

In case a plurality of hinged plates 12 where arranged above a same clamping bar 5, these various plates may be coupled by means of links or any other suitable means.

Thus, in this last instance it is only necessary to actuate the plate 12 nearest to the door of the container for moving the other plates to the same position. However, other control members may also be used for controlling this operation from the threshold of the container or from the end of each clamping device if a plurality of such devices are provided in the container.

As already explained in the preamble of this specification, the container according to this invention facilitates considerably the operations required for transporting a given product or load in a container.

To this end, the first step consists in securing the load to the pallet 3 by using suitable and conventional fastening means. However, this operation is extremely easy since it is performed outside the container. Then the assembly (load and pallet) is introduced into the container 1, after the clamping bars 5 have been lifted. This introduction is carried out for example by means of a forklift truck of the type currently used for handling palletized goods. However, the same operation may also be carried out by using rollers, a roller conveyor, or other suitable means.

Thus, the pallet 3 with its load M is disposed inside the container and more particularly within the space defined by the longitudinal members 8. The load is thus already held against motion in a horizontal plane. Besides, these longitudinal members 8 act as guide members and facilitate the proper positioning of the pallet 3 during the introduction thereof into the container.

However, the fastening of the pallet 3 is subsequently completed by means of the aforesaid clamping bars 5. To this end, the locking hinged plates 12 must be unfolded as described in the foregoing. Thus, the bars 5 are clamped against the lateral edges 6 of the pallet so as to wedge same and therefore the load M against the floor 9 of the container.

This operation is particularly easy to perform since the locking plates 12 can be actuated from the threshold of the aperture of the container.

This container may be used for transporting relatively bulky products or loads by resorting to different transport means, such as ships, aircrafts or railway cars, or trucks. Besides, this container may be used for carrying the load along only one fraction of the complete journey contemplated, for example in the hold of a cargo ship; at the end of the ship's journey the load can be extracted from the container and directed to its final delivery place without detaching the load from the pallet.

It will be readily understood that the operations necessary for extracting the load from the container 1 can be achieved with the same facility as the above-described introduction and locking steps, since the pallet 3 can be removed by simply retracting the clamping bars 5. Besides, the container may comprise if desired retaining means adapted to hold these bars in their raised position.

FIGS. 2 to 7 inclusive illustrate another form of embodiment of a container 1a constructed according to the teachings of this invention.

In this alternate construction the clamping members adapted to hold the pallet 3 against motion consist likewise of a pair of bars 5a overlying the lateral edges of the floor or bottom 9a of the container. However, the mounting method and the locking members of these two bars differ somewhat.

In fact, each bar 5a is pivotally mounted at its front end to a horizontal pivot pin 14 consisting of a pair of lateral trunnions journaled in bearings formed in a transverse bar 15 secured to the front edge of the floor 9a of this container.

At the opposite end, i.e. adjacent the container's aperture, suitable means are provided for clamping these two bars. These means may consist for example of a pair of screw-threaded rods 16 pivotally mounted at their lower ends so that they can pivot in vertical planes parallel to the longitudinal axis of the container. To this end the lower end of these rods may comprise a pair of lateral trunnions 17 mounted in bearings formed in a transverse bar 18.

The function of these two pivotally mounted rod consists in engaging a fork 19 formed at the corresponding end of said locking bars 5a. Now each rod carries a correspondingly tapped wheel 20 adapted to act as a clamping nut, one or a plurality of lock washers 21 being advantageously disposed thereunder.

This modified form of embodiment of the device of this invention is adapted to be operated somewhat like the preceding form of embodiment. However, each locking bar 5a may advantageously carry a pair of clamping shoes 5b (illustrated in dot and dash lines in FIG. 3) designed for efficiently clamping the upper edge of the pallet 3 to be fastened in position.

Of course, when the pallet is introduced into the container the locking members consisting of said screw rods 16 with their clamping wheels 20 must be pivoted forwards, so that the locking bars 5a can easily be raised. Then, the rods 16 are restored to their vertical position in which they engage the forks 19 provided at the front end of these bars, so as to clamp same against the pallet.

FIG. 8 illustrates a further form of embodiment of the anchoring device of this invention. This construction comprises on either side of the container 1b a pair of clamping shoes 22 adapted to bear against the top of the corresponding lateral portion 6 of the pallet 3 to be anchored to the floor of the container.

These shoes are pivotally mounted at 23 to the end of a pair of bellcrank levers 24.

Each bellcrank lever 24 is pivotally mounted about a horizontal pivot 25 carried by the vertical wing of a horizontal angle section 8b secured to the corresponding lateral side of the bottom or floor 9b of the container.

At their opposite ends these two bell crank levers 24 are pivotally connected to a pair of sockets 26a, 26b engaging a rotary shaft 28. The socket 26a disposed at the end of the device which is adjacent the aperture of the container consists of a nut screwed on a threaded portion 27 of shaft 28. The other socket 26b disposed at the opposite end is mounted between a pair of rings 28a secured to the shaft 28 by means of pins.

The end of shaft 28 which is adjacent the aperture of the container comprises a member for easily controlling the rotation of this shaft about its axis, said member consisting for example of a square-sectioned portion 29 engageable by a suitable spanner, handle or any other suitable driving member. Besides, a brake or any other suitable locking system may be provided.

Thus, when the shaft 28 is rotated in the proper direction the pair of bellcrank levers 24 are pivoted in opposite directions, as shown by the arrows $F_1$ and $F_2$, so as to press the pair of locking shoes 22 against the top of the pallet to be held against motion. Of course, rotating the shaft 28 in the other direction will cause these bellcrank levers 24 to pivot in the direction opposite to that shown by these arrows $F_1$ and $F_2$, respectively, so as to raise the locking shoes 22 and free the pallet, adequate stop members 30 being provided for limiting this release movement.

Under these conditions, this clamping device can easily be controlled from the threshold of the container 1b or from the end of each clamping device in case a plurality of similar devices are provided, in a same container. Of course, the method of utilizing this container is the same as in the case of the preceding forms of embodiment.

However, these various forms of embodiment of the invention should not be construed as limiting the field of the invention; in fact, the pallet-carrying container according to this invention can be embodied in many different ways without departing from the basic principles of the invention. Thus, the locking bars or clamping shoes of each holding device may be arranged transversely in a container, instead of longitudinally. In this case, the clamping bars or shoes will engage the transverse sides of the pallets to be held, so as to clamp same against the floor of the container.

Besides, the various component elements of each clamping or holding device may be mounted directly to the lateral walls and floor of the container; in this case, the above-mentioned longitudinal or transverse members can be dispensed with.

Moreover, it may be noted that it is the object of this invention to provide not only an improved transport container but also a device for holding products, goods or loads during their transport, this device consisting of the combination of a container of the type described hereinabove with a pallet adapted to be engaged into such a container.

However, the invention further includes a device for holding against motion and clamping one or a plurality of pallet inside any transport container, this device being specially designed for equipping containers of conventional design in order to convert them into pallet-carrier containers of the above described types, so that they can receive one or more pallets supporting the goods, products or loads to be transported.

I claim:

1. Container adapted to receive goods during their transport, comprising means mounted within said container for holding one or more pallets against motion, said pallets adapted to carry the goods to be transported and adapted for placement on the floor of the container, said means comprising movable clamping members disposed above the floor of said container and mounted on the side walls of said container, said clamping members being movable between a first position in which said pallet is easily inserted into said container and a second position in which said clamping member securely clamps said pallet against the floor of the container.

2. A container according to claim 1 wherein each said means for holding the pallet further comprises a pair of clamping shoes, said shoes being carried on a pair of bellcrank levers, said bellcrank levers being connected together by a control member for pivoting said bellcranks.

3. A container according to claim 2 characterized in that the bellcrank levers carrying said clamping shoes are pivoted on a longitudinal member secured to the floor of the container, said longitudinal member acting as a guide member when the pallet is introduced into the container.